G. P. KROLL & H. WEBER.
BARREL CLEANING MACHINE.
APPLICATION FILED FEB. 11, 1908.

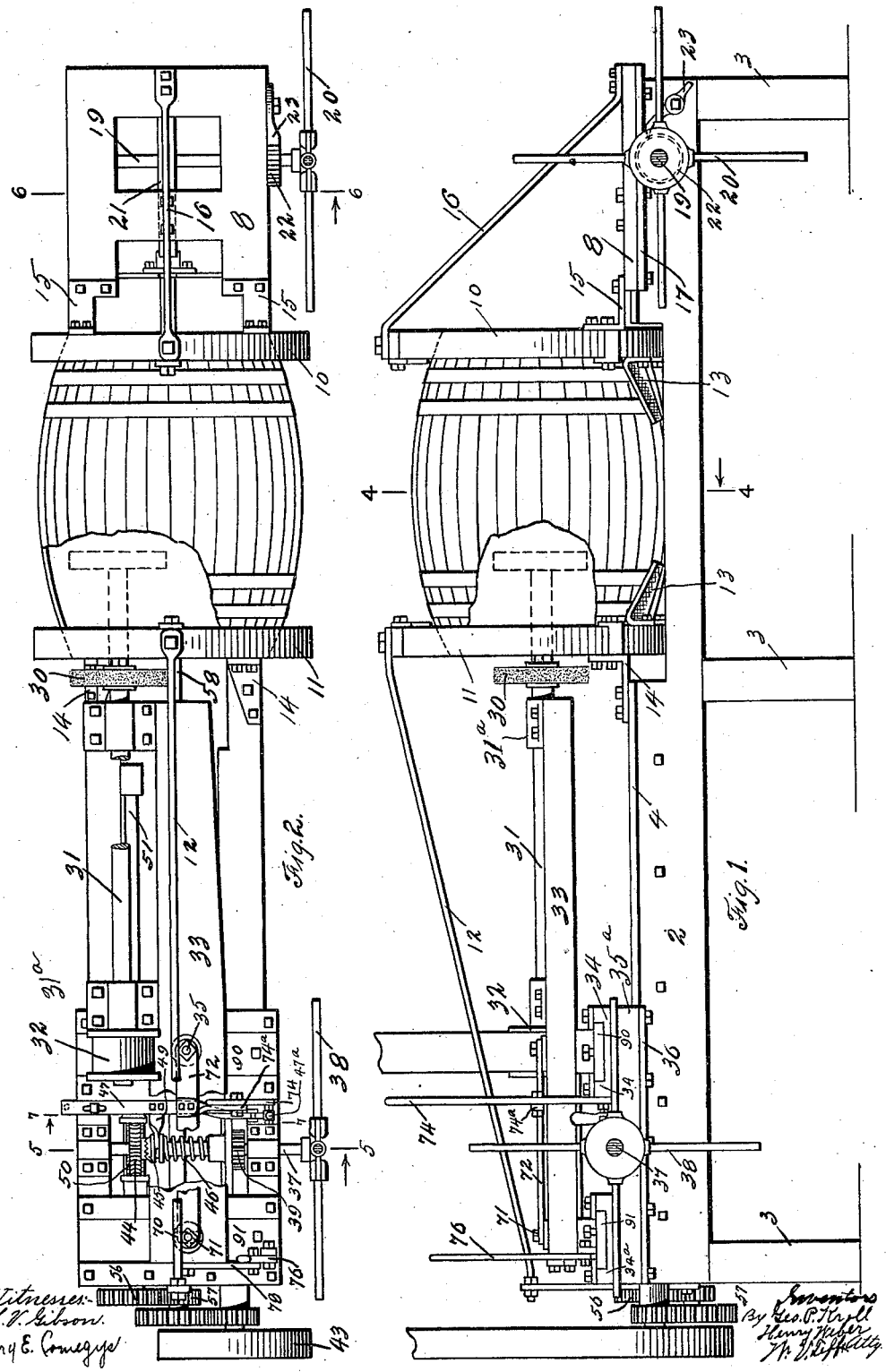

996,864.

Patented July 4, 1911.
3 SHEETS—SHEET 2.

Witnesses:
Inventors
George P. Kroll
Henry Weber
By
Atty.

G. P. KROLL & H. WEBER.
BARREL CLEANING MACHINE.
APPLICATION FILED FEB. 11, 1908.
996,864.
Patented July 4, 1911.
3 SHEETS—SHEET 3.
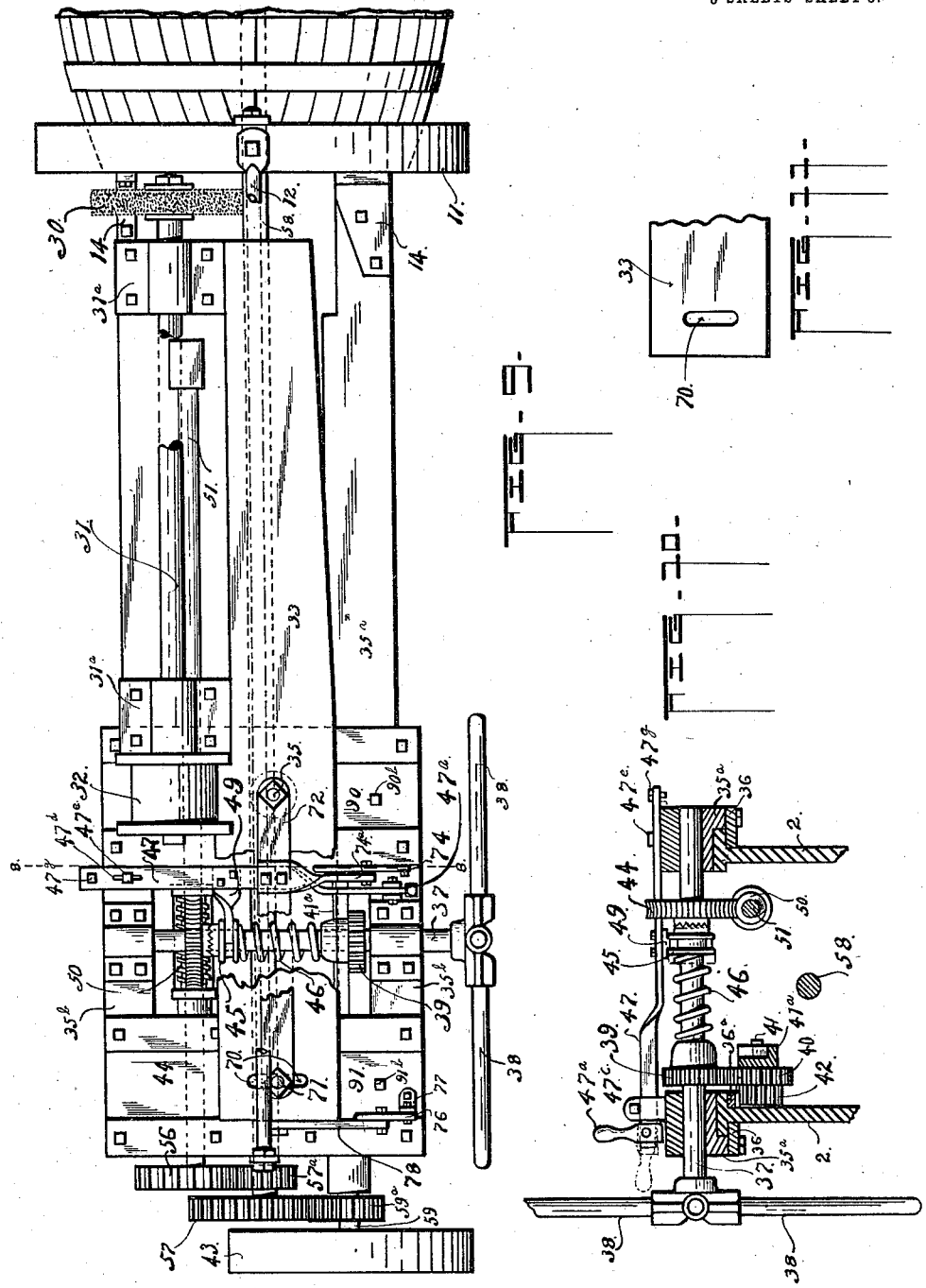
WITNESSES
INVENTORS
Geo. P. Kroll and
Henry Weber
By W. V. Tefft
ATTY.

UNITED STATES PATENT OFFICE.

GEORGE P. KROLL AND HENRY WEBER, OF PEKIN, ILLINOIS.

BARREL-CLEANING MACHINE.

996,864.

Specification of Letters Patent. Patented July 4, 1911.

Application filed February 11, 1908. Serial No. 415,323.

*To all whom it may concern:*

Be it known that we, GEORGE P. KROLL and HENRY WEBER, citizens of the United States, residing at Pekin, in the county of Tazewell and State of Illinois, have invented certain new and useful Improvements in Barrel-Cleaning Machines; and we do hereby declare that the following is a full, clear, and exact description of the invention, which will enable others skilled in the art to which it appertains to make and use the same.

Our invention relates to a machine for removing the charred interiors of whisky barrels whereby a very efficient and useful device is provided for the purpose.

In the manufacture of whisky, the interior of the containing barrels in which the spirits are stored must be charred, and to remove the char that the barrels may be again used, is the purpose of our present invention.

More particularly, our invention has reference to a device adapted to apply frictional means for removing the charred interior surface of whisky barrels.

That our invention may be more fully understood, reference is had to the accompanying drawings, in which—

Figure 3:
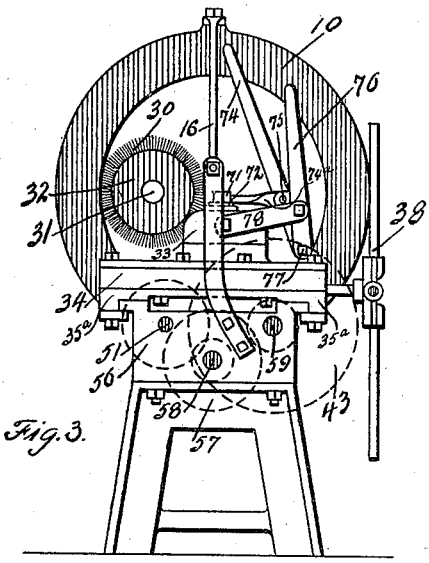
Figure 4:
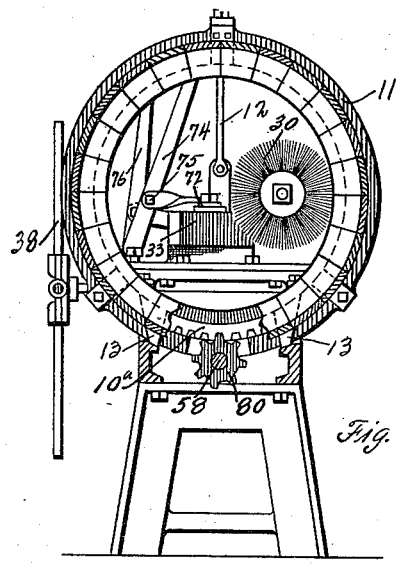
Figure 5:
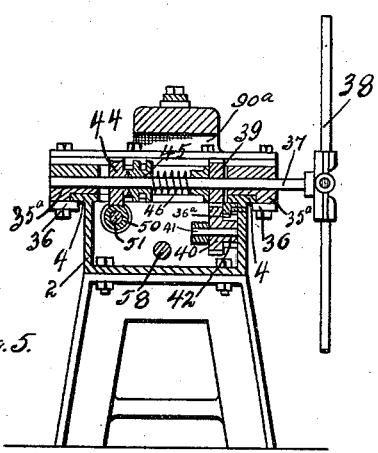
Figure 6:
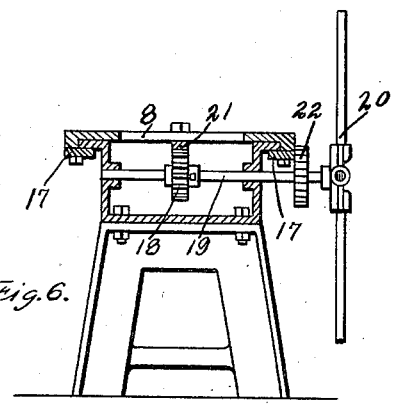
Figure 7:
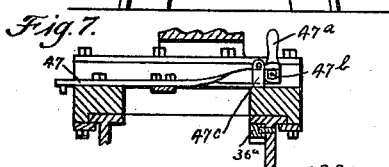
Figures 8, 12, 13:
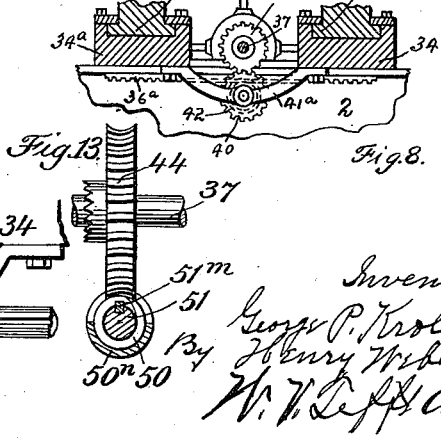

Figure 1 is a side elevation of a machine containing our invention. Fig. 2 is a plan view of the same. Fig. 3 is an end view showing the various parts in their relative positions. Fig. 4 is a sectional view on the line 4—4 of Fig. 1. Fig. 5 is a sectional view on the line 5—5 of Fig. 2. Fig. 6 is a sectional view on the line 6—6 of Fig. 2. Fig. 7 is a detail sectional view showing the mechanism of a clutch shifting lever. Fig. 8 is also a detailed sectional view through the line 7—7 of Fig. 1. Fig. 9 is an enlarged view showing a portion of the same parts that are shown in Fig. 2; and Fig. 10 is a cross section on the line 8—8 of Fig. 9. Fig. 11 is a detail view. Fig. 12 is a detail view showing the manner of supporting a worm wheel upon a shaft and the manner of its connection with the movable carriage and its operative relation with the worm wheel, and Fig. 13 is a detail view of the same matter shown in Fig. 12, viewed from another position.

In the drawings, 2 indicates a frame structure built in rectangular form and having the supporting legs 3, there being provided on each of its longitudinal sides the projecting ledges 4. This framework is adapted to support the working parts of the machine.

10 and 11 are concentric rings adapted to support concentrically arranged cog rings such as are commonly used in chamfering, crozing or howeling machines, the supporting ring 11 being made stationary in connection with the main frame, and braced in position by the rod 12. The ring 10 is adapted to be movable toward and from the stationary ring 11 to facilitate the placing and removal of barrels for operation within the machine.

13—13 are inclined supports, one set connected with each of the rings 10 and 11 and are provided with the proper incline so as to facilitate the raising of the barrel into proper position to be clamped between the holding rings 10 and 11 as the adjustable ring is moved forward. Ring 11 is connected with the supporting framework by means of the angle bracket 14. Ring 10 is connected with the movable bed frame 8 by means of the angle brackets 15 and is braced thereto by means of the brace rod 16. The bed plate 8 is formed with depending side flanged pieces best shown in Fig. 6, and to the depending flanged parts are secured plates 17 which extend underneath the flanges 4 of the main frame. The adjustment of the ring 10 is accomplished through the cog wheel 18 carried upon the cross shaft 19 which is properly supported in the framework of the machine as best shown in Fig. 3, and is operated by the hand levers 20 to cause the said cog wheel 18 to operate in connection with the cog rack 21. This cog rack runs longitudinally of the bed frame a sufficient distance to accomplish the desired length of adjustment necessary to the supporting ring 10. The details of this particular part of the machine are best shown in Fig. 6 of the drawing.

In the practical operation of the device, the ring 10 having been moved rearwardly from the position shown in Fig. 1 a sufficient distance, the barrel is rolled upon the inclined supports 13—13, then by operation of the hand levers 20 in the proper direction, the bed plate 8 and the ring 10 supported in connection therewith are moved toward ring 11 until the ends of the barrel are securely clamped between the respective cog rings 10$^a$ (shown in Fig. 4) carried one within each of the rings 10 and 11. To facilitate the holding of the bed plate 8 in proper position to support the ring 10 in contact with the end of the barrel, the ratchet wheel 22 is provided, fixed upon cross shaft 19 (shown in Fig. 6) which is adapted to be engaged by the dog 23 suitably pivoted to the framework of the machine. It will be seen that as the bed frame 8 is moved forwardly to the desired position, the dog 23 engaging the ratchet wheel 22 will cause the bed frame to be held from backward movement.

In carrying out our invention, it is designed that a brush, preferably constructed of steel wire, be so carried with relation to the barrel that it is supported in turn within the concentric rings 10 and 11, that it may be moved into close relation with the interior circumferential face of the barrel and that it may be adjusted and held in such a manner as to be held against the interior surface of the barrel so as to conform with the curve therein, while the brush is being projected forwardly and rearwardly within the same.

Referring to the drawings, 33 designates a bar extending longitudinally of the framework and adapted to support the brush, the said bar 33 having laterally projecting parts adapted to support shaft 31, the caps $31^a$ $31^a$ bearing over such lateral projections and also shaft 31 and together with the laterally extending projections serving to form a bearing for said shaft.

34 $34^a$ are cross frame pieces or channel bars properly secured to the bed frame $35^a$ and 90 91 are bars bearing within the channels of cross frame pieces 34 and $34^a$ adapted to be movable back and forth therein or to be fixed in connection therewith by means of the set screws $90^b$ $91^b$, these said bars being held in place within the channels by means of suitable plates secured to the cross frame pieces 34 $34^a$ and bearing over the edges of said bars substantially as shown in the several figures of the drawings. At the central portion of each of the bars 90 91 there is a raised portion as $90^a$, one of such parts being shown in Fig. 5 and upon which said raised portions the bar 33 is adapted to rest. The bar 33 is mounted pivotally upon the upwardly projecting part of bar 90 by means of the bolt 35 projecting upwardly from said raised part. The movement of the rear portion of bar 33 is designed to be limited and for that purpose the pin 71 projecting upwardly from the raised portion on bar 91 is provided, and the bar is slotted as at 70 to permit lateral movement of the rear end thereof at the same time limiting the extent of its movement.

74 is a lever designed to shift the bar 33 laterally and for that purpose is pivoted to the cross frame piece 34, the said lever being connected with the bar 33 by means of the link $74^a$, one end thereof being secured to said bar and the other end thereof pivotally connected to the lever as at 75 (shown in Fig. 3) the said link connecting with bar 72, the respective ends of which are supported in connection with pins 35 and 71. By means of lever 74 when the set screws $90^b$ $91^b$ are unscrewed, to permit the bars 90 91 to be moved, the operator, by moving the handle, can readily move the bar 33 and the connected parts laterally. This lateral movement of the bar 33 is provided to move the brush laterally to compensate for wear thereon resulting in the reduction of its diameter. The bar 33 is adapted to be moved about the pivot bolt 35 for the purpose of throwing the brush to and from its work and this is accomplished through and by means of lever 76 suitably pivoted to bar 91 as at 77, as shown in Figs. 3 and 9, and its connection with bar 78 pivoted at one end to the bar 33 and at its other end to lever 76. 30 indicates the wire brush upon one end of shaft 31 supported in the manner previously described.

32 is a pulley upon the shaft and the pulley and shaft are designed to be driven from a wide faced pulley wheel carried upon the driven shaft (not shown) placed in parallel relation with shaft 31 and being long enough to accommodate the full length of travel of bar 33 carrying shaft 31 and pulley 32.

The cross frame pieces 34 $34^a$ are connected with and projecting upwardly from a main rectangularly shaped plate $35^a$ which embraces the cross frame pieces 34 $34^a$ and the connecting pieces as $35^b$ as best shown in Figs. 8 and 9, which connected parts will hereafter be referred to as the carriage.

The carriage is supported upon the upper portion of the frame 2 which said upper portion is formed with bearing faces adapted to form ways for the movement of the carriage supported thereon, the said carriage being formed with cutaway parts, as best shown in Fig. 10, adapted to be seated upon the ways of frame 2 and secured thereto by means of plates as 36 36. The carriage is designed to be moved forwardly and rearwardly and with it the pivoted bar 33 to cause the brush 30 to be moved forwardly and rearwardly.

37 is a shaft supported upon bed frame of the carriage and is provided with a cog wheel 39 fixed thereon which meshes with the cog wheel 40 best shown in Fig. 10, the cog wheel 40 being carried loose upon the pin 41 which is supported in the yoke $41^a$ which is secured to the bottom of the carriage, as best shown in Fig. 8. The cog wheel 42, also loose upon pin 41 but secured to cog wheel 40, meshes with the cog rack 36 which is secured to the under side of the flange projection of frame 2, which forms the way upon which the carriage moves, said cog rack running lengthwise of the frame 2, a sufficient distance, covering the length of travel of the carriage.

38 are hand levers connected with shaft 37 and adapted to turn the shaft to cause the carriage to be moved rearwardly to withdraw the brush from the barrel after it has been cleaned.

51 is a driven shaft suitably supported in the frame structure and is provided at its rear end with the cog wheel 56 which is driven from belt wheel 43, as hereinafter explained.

50 is a worm screw upon shaft 51 provided with the spline $51^m$ as shown in Fig. 13, there being provided a groove in the shaft extending lengthwise thereof a considerable distance, thereby adapting the worm screw to move lengthwise of the shaft as the carriage is moved.

$50^n$ is a bracket secured to the carriage frame pieces 34, $34^a$ and is adapted to bear against the ends of the worm screw to cause it to be moved with the movement of the carriage.

44 is a worm wheel upon shaft 37 having its hub serrated as best shown in Figs. 9 and 10.

When the carriage is being moved, it will be seen that the brackets 100 bearing against the ends of worm screw 50 will cause said worm screw to be moved with the carriage so that it will always be in position to be engaged by worm wheel 44.

45 is a clutch, one face thereof serrated to engage the serrations on the hub of worm-wheel 44 and normally is held under tension of spring 46 with the serrations of the clutch and the worm wheel in engagement. The clutch is circumferentially grooved and 49 is a reach fixed to the bar 47 and bifurcated at its outer end, engaging the circumferential groove in said clutch.

$47^c$ is a guide way for bar 47 comprising two upwardly extending parts between which said bar lies, there being a bolt provided connecting the upwardly extending portions adapted to bear over said bar 47.

$47^a$ is a cam lever pivoted to bar 47 and is adapted to draw the bar forwardly or push it rearwardly for the purpose of moving clutch 35 in and out of engagement with worm wheel 44. Bar 47 is provided with the slot $47^d$ at its rear end and is supported in place by means of the headed pin $47^e$ but sufficient play is left between the head of the pin and the bar to permit the said bar to move back and forth.

$47^g$ is a pin in the end of bar 47 depending a short distance from the under face thereof and adapted to form a stop for the forward movement of the bar as cam lever $47^a$ is turned downwardly. The carriage and the brush 30 are adapted to be moved forwardly by power applied to belt wheel 43 and delivered through cog wheel 56 to shaft 51 and when clutch 45 is in engagement with worm wheel 44 and power is applied, the shaft 51 will be turned, causing shaft 37 to be turned and with it the cog wheel 39 thereon, which will convey the power through cog wheels 40 and 42 to the cog rack $36^a$, causing the carriage to be moved forwardly. When it is desired that the carriage be moved rearwardly, clutch 45 is disengaged from worm wheel 44 by means of the cam lever 47 at its connection with clutch 45, then by applying hand power to the hand levers 38 and turning the shaft in the reverse direction from that which caused the forward movement of the carriage, the carriage will be moved rearwardly to any position desired.

58 is a shaft running longitudinally of the framework and has fixed upon its rear end the cog wheel 57 adapted to be driven from the belt wheel 43 and upon the other end of the shaft cog wheels as 80 (best shown in Fig. 4) are fixed upon said shaft, adapted to mesh with cog rings as $10^a$, supported in each of the cog rings 10 and 11, only one of such rings being shown as both are alike and are similarly supported in connection with said rings. Belt wheel 43 is fixed upon shaft 59 which is suitably journaled in the framework of the machine, and cog wheel $59^a$ is fixed thereto and meshes with cog wheel 57 fixed upon the end of shaft 58. $57^a$ is also a cog wheel fixed upon shaft 58 and meshes with cog wheel 56 fixed upon shaft 51.

In the operation of the machine, the parts being in the relative positions shown in Figs. 1 and 2 and the barrel having been placed and properly secured between the rings 10 and 11 and power having been applied to turn belt wheel 43 in the proper direction, the clutch 45 being in engagement with the worm wheel 44, the barrel will be revolved through the cog connections with the belt wheel and the cog rings of rings 10 and 11 and shaft 51 will be caused to be revolved, causing the carriage to be moved forwardly to enter the barrel and the shaft 31 carrying the friction brush is caused to be simultaneously driven through its belt connection from pulley 32 to the wide faced pulley upon the driven shaft, as hereinbefore explained. As the brush enters the barrel, the operator applying power to lever 76, drawing the rear end of frame 33 toward him, the brush 30 will be caused to contact with the interior face of the barrel, causing the char to be removed from the surface thereof, the said brush being projected within the barrel through its entire length, and thus effectually removing the char therefrom. At the conclusion of the required forward projection to accomplish this result, the cam lever $47^a$ is turned down to withdraw clutch 45 from its engagement with worm wheel 44, thus leaving the worm wheel 44 to run idly upon shaft 37, then the operator, by applying hand power, will return the carriage to the initial position, exemplified by the figures hereinbefore referred to.

What we claim is:

1. In a machine of the class described, in combination, a stationary frame provided with means thereon for revolubly supporting a barrel, a carriage supported on and longitudinally movable on the stationary frame, a brush frame pivoted upon the carriage, a brush supported on the brush frame, means for driving the brush, connections between the pivoted brush frame and the carriage to accommodate the former being turned upon the latter and means for limiting the turning movement of the brush frame, a driven shaft in the stationary frame, means connecting it to revolve the barrel supporting means, driving connections between the carriage and the stationary frame and means connecting the driven shaft in the stationary frame with the connecting means between the carriage and the stationary frame, whereby the carriage may be moved forwardly, and means for moving the carriage rearwardly.

2. In a machine of the class described, in combination, a stationary frame, means thereon for revolubly supporting a barrel, a revoluble brush, means for revolving it, a carriage supported and longitudinally movable upon the stationary frame, and adapted to support the brush, means for revolving the barrel supporting means, driving connections between the carriage and the stationary frame, a driven shaft in the stationary frame, means connecting the driven shaft and said driving connections to cause the carriage to be moved forwardly, and means operated from said driven shaft to cause the barrel supporting means to be turned.

3. In a machine of the class described, in combination, a stationary frame, means thereon for revolubly supporting a barrel, a revoluble brush, means for revolving it, a carriage supported and longitudinally movable upon the stationary frame, and adapted to support the brush, means for revolving the barrel supporting means, driving connections between the carriage and the stationary frame, a driven shaft in the stationary frame, means connecting the driven shaft and said driving connections to cause the carriage to be moved forwardly, and means operated from said driven shaft to cause the barrel supporting means to be turned.

4. In a machine of the class described, in combination, a stationary frame, means thereon for revolubly supporting a barrel, a revoluble brush, means for revolving it, a carriage supported and longitudinally movable upon the stationary frame, and adapted to support the brush, means for revolving the barrel supporting means, driving connections between the carriage and the stationary frame, a driven shaft in the stationary frame, means connecting the driven shaft and said driving connections to cause the carriage to be moved forwardly, and means operated from said driven shaft to cause the barrel supporting means to be turned.

5. In a machine of the class described, in combination, a stationary frame provided with a barrel supporting means thereon, a carriage supported upon the frame in a relation to be moved longitudinally thereon, and adapted to carry a rotatable brush thereon, means for moving the carriage forwardly, comprising a driving shaft in the stationary frame, a shaft in the carriage, a cog rack upon the stationary frame, means for operatively connecting the shaft in the carriage with the cog rack, to facilitate a rearward movement of the carriage and means for operatively connecting the shaft in the stationary frame with the shaft in the carriage, whereby when the shaft in the stationary frame is driven, the carriage will be moved forwardly.

6. In a machine of the class described, in combination, a stationary frame, means for revolubly supporting a barrel, a frictional brush adapted to engage the interior surface of the barrel, a carriage longitudinally movable upon the frame for supporting the brush, means for revolving the brush, means for moving the carriage forwardly, comprising a constantly driven shaft in the stationary frame, a shaft in the carriage, means for producing or destroying operative engagement between said shafts, means driven from the carriage shaft, engageable with means on the stationary frame, whereby connection may be made between said shafts to cause the carriage to be moved forwardly upon the stationary frame.

7. In a device of the class described, in combination, a stationary frame, barrel supporting means thereon comprising a pair of vertically disposed frame parts, one stationary and the other movable upon the frame revoluble members supported therein adapted to engage the ends of a barrel, a longitudinally movable carriage supported upon the stationary frame, a rotatable brush supported upon the carriage in a swingable relation therewith, means for driving the brush, and means for revolving the barrel supporting members and moving the carriage forwardly.

8. In a device of the class described, in combination, a main supporting frame, barrel supporting and revolving means thereon, comprising a pair of vertically disposed frame parts, one stationary and the other movable upon the frame adapted to engage the ends of a barrel, a carriage movable upon the main frame, a revoluble brush supported thereon, means for moving the carriage forwardly and rearwardly and rotating the barrel supporting members and means under the control of the operator for causing the brush support to be swung laterally to cause the brush to engage the surface of the barrel while the brush and barrel are being revolved.

9. In a device of the class described, in combination, a stationary frame, a pair of barrel supports carried thereon, one stationary with relation to said frame and the other adjustable thereon, a friction brush, means for rotating it, a carriage longitudinally movable upon the stationary frame for supporting the brush, and means for moving the carriage forwardly and rearwardly to cause the brush to be projected within the barrel and to be withdrawn therefrom, the brush and the barrel being adapted to turn simultaneously with the forward movement of the brush.

10. In a device of the class described, in combination, a stationary frame, a revoluble support for engaging the ends of a barrel, frame parts for supporting the same, one fixed upon the stationary frame, and the other adjustable with relation thereto, means for moving the adjustable frame part, a revoluble brush, means for rotating the same, a pivoted laterally adjustable frame for supporting the brush, a carriage movable upon the stationary frame for supporting the brush frame, means for rotating the brush, and means for revolving the barrel support and for moving the carriage forwardly.

11. In a machine of the class described, in combination, a stationary frame, means thereon for revolubly supporting a barrel, a rotary brush, a carriage for supporting the brush movable longitudinally upon the stationary frame, means for revolving the brush, a drive shaft on the stationary frame, means connecting it with the barrel supporting means to continuously revolve the latter, and means connecting the driven shaft with the stationary frame and the carriage in a relation to cause the carriage to be moved forwardly.

12. In a device of the class described, a stationary frame provided with means thereon for revolubly supporting a barrel, a cog rack extending longitudinally of the frame, a carriage movable longitudinally of the frame, a brush frame horizontally turnably supported upon the carriage, a revoluble brush supported thereon, means for driving the brush, a driven shaft in the stationary frame, means connecting it to drive the barrel supporting means, a cross shaft in the carriage provided with a gear meshing with the cog rack on the stationary frame, hand levers on the shaft for turning the latter to cause the carriage to be moved rearwardly on the stationary frame, means connectible from the driven shaft of the stationary frame with the cross shaft of the carriage to drive the latter to cause the carriage to be moved forwardly.

13. In a device of the class described, in combination, a stationary frame provided with a cog rack extending longitudinally thereof and with revoluble barrel supporting means, a carriage movable longitudinally upon the stationary frame, a pivot frame upon the carriage, a brush supported upon said pivot frame, means for driving the brush, a hand lever and a reach connecting the pivot frame and the stationary frame in a relation that by the application of manual force the pivot frame may be turned to cause the brush to be swung into contact with the interior of the barrel, a cross shaft in the carriage provided with a gear meshing with the cog rack of the stationary frame and levers to cause the shaft to be turned to move the carriage rearwardly, a driven shaft in the stationary frame connected to turn the barrel supporting means and means connectible at will with the cross shaft in the carriage to cause the latter to be turned in the proper direction to move the carriage forwardly.

14. In a device of the class described, in combination, a stationary frame provided with revoluble barrel supporting means, a carriage movable longitudinally of said frame, a brush supporting frame laterally movably and horizontally swingably supported upon the carriage, means for turning the brush frame and limiting the movement thereof comprising a lever and arm connecting the brush frame and the stationary frame in a relation that by the application of manual force the brush frame will be turned to cause the brush to contact with the interior of the barrel, and a pin upon the stationary frame and a slot in the brush frame to limit the movement of the latter, a cross shaft in the carriage, means thereon connecting with the stationary frame in a relation that according to the direction of turning of the shaft the carriage will be moved either forwardly or rearwardly, hand levers on the shaft to turn it to cause the carriage to be moved rearwardly, means for moving the carriage forwardly comprising a driven shaft in the stationary frame provided with a worm screw splined and longitudinally movable on said shaft, the cross shaft of the carriage, a worm wheel thereon engaging the worm on the driven shaft of the stationary frame.

15. In a device of the class described, in combination, a stationary frame provided with revoluble barrel supporting means, a carriage movable longitudinally of said frame, a brush supporting frame laterally movably and horizontally swingably supported upon the carriage, means for turning the brush frame and limiting the movement thereof comprising a lever and arm connecting the brush frame and the stationary frame in a relation that by the application of manual force the brush frame will be turned to cause the brush to contact with the interior of the barrel, and a pin upon the stationary frame and a slot in the brush frame to limit the movement of the latter, a cross shaft in the carriage, means thereon connecting with the stationary frame in a relation that according to the direction of turning of the shaft the carriage will be moved either forwardly or rearwardly, hand levers on the shaft to turn it to cause the carriage to be moved rearwardly, means for moving the carriage forwardly and to interrupt such movement, comprising a driven shaft in the stationary frame provided with a worm screw splined and longitudinally movable thereon, the cross shaft, a worm wheel loosely mounted thereon, a clutch fixed on the cross shaft and means for operating said clutch to engage or release the worm wheel as desired, producing a connection to turn the cross shaft in the proper direction to move the carriage forwardly or to be disconnected to allow it to remain at rest, or to leave it free to be moved rearwardly through the opposite direction of turning of said shaft.

In testimony whereof we have affixed our signatures, in presence of two witnesses.

GEO. P. KROLL.
HENRY WEBER.

Witnesses:
EDUARD A. EGGER,
H. A. SCHURMAN.

---

Copies of this patent may be obtained for five cents each, by addressing the "Commissioner of Patents, Washington, D. C."